United States Patent Office 3,687,691
Patented Aug. 29, 1972

3,687,691
METHOD OF INCORPORATING VOLATILE AROMATICS INTO HARD CANDY
Jerome Adelstein, Westchester, N.Y., and Robert R. Frey, Montgomery, Pa., assignors to Richardson-Merrell, Inc., New York, N.Y.
No Drawing. Filed Aug. 10, 1970, Ser. No. 62,726
Int. Cl. A23g *3/00*
U.S. Cl. 99—134 R
3 Claims

ABSTRACT OF THE DISCLOSURE

Incorporation of aromatic oils into hard candy at temperatures of 220°–260° F. by granulating gels of aromatic oils and microfine silica with polyethylene glycols having a molecular weight of 3,000–10,000 and mixing the granules with the hot plastic hard candy.

---

This invention relates to a method of making hard candy. More particularly, the invention relates to a method of incorporating volatile aromatics into hard candy such as, for instance, lozenges and cough drops.

Hard candy is a solution of sugars which has been cooked to so high a temperature that most of the moisture is removed. In making hard candy an aqueous solution of sucrose and corn syrup (liquid glucose) is heated until a temperature within the range of about 260° F. to 300° F. has been reached and then the cooked mass is subjected to a vacuum to bring the water content down to about 1 to 1.5%. The cooked plastic candy mass is then removed from the vacuum chamber at a temperature of about 240° F. and is placed on a conventional mixing and cooling slab preferably of the Berks type. At this time, coloring and flavoring materials, volatile aromatic oils, therapeutic agents, and other modifying agents which are stable at the temperature of the hot candy mass, are then poured onto the hot candy and the additives are mechanically worked into and distributed uniformly throughout the hot candy by mechanical means.

During the mixing of the volatile aromatic oils and the like into the hot candy there is a considerable loss of the volatile components by evaporation. Also, because the oils are relatively insoluble in the candy they tend to run off the hot candy mass and are not all incorporated in the hot candy by the mixing operation. It is not uncommon, for instance, to lose half of the aromatic oils by evaporation and "run-off" and inasmuch as they are often the most expensive ingredients of the final product it is highly desirable that this heavy loss be reduced.

Unfortunately, it has not been feasible to incorporate these aromatic oils into the sugar solution before the candy is cooked because of almost complete loss due to evaporation during the time that the moisture content of the solution is being reduced by heat and the high vacuum. Also, some losses due to degradation of the aromatic substances may occur during the heating.

The present invention provides a means of incorporating relatively large and effective amounts of volatile aromatic substances into hard candy, lozenges and cough drops. Many volatile aromatics such as eucalyptol, menthol, benzyl alcohol, tolu balsam, thymol, camphor, and oils of peppermint, eucalyptus, spearmint, cinnamon, sassafras, clove, pine, juniper, lemon, orange, coriander and others, from both natural sources or made synthetically, are incorporated into hard candy, lozenges and cough drops for flavor as well as for medicinal purposes. Although some of these are solids at room temperature, they are liquids at temperatures of 200° F. and in some cases mixtures of the solid aromatics form oily liquids when mixed together and these are all included under the term volatile oils as used herein. Many of the commonly used aromatics have carminative, antiseptic, local anesthetic, local analgesic, stimulant, expectorant, diuretic and other pharmacological properties.

The volatile aromatic oils, which are also referred to as essential oils, are obtained from plant sources by distillation or solvent extract. They are distinguished from the fixed oils, such as corn oil, cotton seed oil, peanut oil, and the like in that they are not glyceryl esters of higher fatty acids. On the other hand, they are highly complex mixtures of terpenes, sesquiterpenes, hydrocarbons, alcohols, acids, esters, aldehydes and many other simple and complex organic moieties. A description of the chemical, physical, and medicinal properties of the aromatic volatile oils may be found in Remington's Practice of Pharmacy, 11th edition, the Mack Publishing Company, Easton, Pa., on pp. 638, 981 through 1108, and elsewhere in the compendium.

The volatility of some of the essential components of these complex oils makes them valuable as flavoring agents and enhances their effectiveness as medicinals. It is this inherent volatility together with their insolubility in the saccharides, that is largely responsible for the difficulty encountered in attempting to incorporate enough of the volatile oils in hard candy so that lozenges and cough drops made therewith will have a satisfactory level of therapeutic activity and flavoring.

In the standard manufacturing procedure the losses of aromatics which occur by spillage, run-off or vaporization, are not always consistent. Thus the hazard of non-uniformity from batch to batch is a problem. There is also the possibility of irregularities within a given batch due to greater concentration of aromatics in one or more portions of the candy mass than others. Such excessive concentration leads to what are termed "hot spots" which are undesirable from the standpoint of quality control and consumer disfavor.

Another disadvantage of excessive vaporization of the aromatics is the eye and nose discomfort it creates in the immediate production area. This is not a serious health problem but fume removal equipment is desirable and necessary to remove lingering vapors from the atmosphere so that workers can remain in the area a longer period of time. Excessive vaporization can also lead to contamination of other products which may be manufactured in the same area at the same time. Thus, a manufacturer may be prevented from utilizing his equipment and area to its maximum efficiency, and scheduling of production needs may also be adversely affected.

The present invention is based upon our discovery that volatile aromatics can be more efficiently incorporated into hot candy if the aromatics are gelled with a microfine colloidal silicon dioxide and made into a granule with polyethylene glycol before they are added to the hot candy. The submicroscopic silica that is used in preparing the gel may be prepared by the vapor phase hydrolysis of a silicon compound, for example, silicon tetrachloride at temperatures around 1100° C. The ultimate particles of these products have diameters in the range of 0.005 to 0.020 micron which are agglomerated into chain-like structures, or clumps, which have a mean diameter of 1 to 10 microns. The product has a bulk density of from 2.5 to 10 pounds per cubic foot. Several such products are available under the trade names Cab-O-Sil, Aerosil, and QUSO. They are variously referred to as "microfine," "submicroscopic," "colloidal" and "fumed" silicas.

A gel containing a volatile aromatic material prepared as described below may be added to the hot candy mass on a Berks mixer and incorporated into the candy without "run-off" or substantial loss of the aromatics by volatilization. However, because the gel is difficult to handle, we prefer that the aromatic-containing gel be converted into a granulation with the aid of polyethylene glycols as will be described.

EXAMPLE I

An aromatic oil-containing gel suitable for use in practicing the present invention is prepared, for instance, by blending together in a suitable mixer 24–45 parts by weight of the microfine silica and 320–370 parts by weight of the selected aromatics which may be any desired mixture of any of the volatile aromatic substances mentioned above. For example, a mixture of 33% eucalyptus oil, 45% methanol, 22% lemon oil may be gelled with microfine silica and as much as 1½% by weight of the aromatics (in gel form) may be mixed in with the hot candy to provide a satisfactorily flavored cough drop.

EXAMPLE II

An easier to use and more efficient product for use in incorporating volatile aromatics in hard candy may be prepared as follows: 200 parts by weight of polyethylene glycol having an average molecular weight of 4,000 is melted and a gelled trituration of 28 parts by weight of micro-fine silica and 360 parts by weight of an aromatic blend such as just mentioned is added with stirring. The homogeneous mass is chilled to about 5° C. and forced through a coarse sieve of about 4 to 10 mesh to obtain a granular material which is easily handled in weighing operations, may be transferred from one container to another, and may be sprinkled by hand or with a spatula over the hot candy mass on the mixer.

EXAMPLE III

In the following example candy cooks were made in a conventional manner. The candy base was made by heating a solution of 60% surcose and 40% corn syrup at 295° F. and then subjecting the material to a vacuum of 28 inches of mercury until the moisture content was reduced to about 1½%. A quantity of the hot candy was poured onto a Berks mixer at a temperature of about 240° F. and 1% by weight of the candy of eucalyptus oil was poured over the hot candy mass and worked into it with the mixer. An assay for eucalyptus oil in the finished hard candy revealed that it contained an average of only 0.46% of eucalyptus oil thus showing that only about half of the eucalyptus oil could be incorporated into the candy by this conventional procedure.

EXAMPLE IV

In another experiment a solution containing 0.82% of eucalyptol and 0.74% menthol based on the weight of the hot candy was attempted to be added by the Berks mixer over a period of about 5–6 minutes. An analysis of the finished hard candy showed that only 38% of the eucalyptol and 52% by weight of the menthol remained in the candy.

EXAMPLE V

A batch of candy was made by cooking 58.5% by weight of sucrose, 39% by weight of corn syrup, 1.8% by weight of polyethylene glycol having an average molecular weight of 4,000, 0.3% of propylene glycol and 0.35% of glycerine at 295° F. and thereafter reducing the moisture content to 1.5% under 28 inches of vacuum. A portion was poured onto a Berks mixer at 240° F. and as much as possible of a solution of 0.82% of eucalyptol and 0.74% of menthol, based on the weight of the hot candy, was slowly mixed into the plastic candy mass over a period of 5–6 minutes. After forming the candy into pieces and cooling, it was found that 43.5% of the eucalyptol remained in the candy and 60% of the menthol remained. The polyethylene glycol and other additives allowed a somewhat higher amount of the aromatics to be retained in the candy.

EXAMPLE VI

In another experiment in which a fumed silica-volatile aromatic gel was used, a candy base was made by cooking together 20.9 kilograms of sucrose, 15.1 kilograms of 43° Baumé corn syrup, 36 de, and 0.4 kilogram of polyethylene glycol 4,000. The moisture was reduced to about 1½% under vacuum and the plastic candy mass was placed on a Berks mixer at about 240° F. A gel made by triturating 0.028 kilogram of the microfine silica and 0.360 kilogram of eucalyptus oil was added to the hot plastic candy in an amount sufficient to supply 1% by weight of eucalyptus oil. When the candy was formed into pieces, cooled and assayed it was found that 76% of the eucalyptus oil remained in the candy. Thus, the addition of the silica increased the aromatic oil retention considerably over that seen in Examples III, IV, V.

EXAMPLE VII

Another conventional hard candy cook was made with 20.9 kilograms of sucrose, 15.1 kilograms of corn syrup, 43° Baumé, 36 de, and 0.2 kilogram of polyethylene glycol 4,000 as in the preceding example. This hot candy mass was poured onto a Berks mixer at 240° F. and a granulation of fumed silica, polyethylene glycol and aromatics which had been previously prepared as described in Example II was sprinkled over the hot candy mass. The amount of the aromatics added were 0.4% menthol, 0.3% eucalyptus oil and 0.19% of lemon oil, all based on the weight of the hot candy. These aromatics in the form of the granulation were worked into the candy on a Berks mixer over a period of 5 to 6 minutes and then transferred to a conventional candy-pulling machine where it was pulled from 1 to 2 minutes at 190–210° F. The pulled candy was transferred to a batch-forming unit-forming apparatus for completion into cough drops. On assay it was found that an average of 82% of the aromatics added to the candy was retained after completion of the batch. Here it was demonstrated that the granulation of silica-aromatics-polyethylene glycol allowed a further increase in aromatics retention.

The aromatic gel that may be used as in Example VI is prepared by simply mixing together the aromatic oils, heated, if necessary, to obtain a fluid condition, with fumed silica. The microfine silica particles impart thixotropic properties to the gel by joining together and trapping the fluid aromatic oil and thus reduce its ability to flow. However, on agitation and shearing the structure breaks down and allows the aromatics to become thoroughly and uniformly incorporated in the plastic candy mass. The formation of gels by means of silicas is well known.

In general, one part of silica will gel six to fourteen parts by weight of an aromatic oil of low viscosity, such as that of eucalyptus oil. Blends of various aromatics such as combinations of menthol, eucalyptus oil, anise oil, peppermint oil, lemon oil, orange oil, benzaldehyde and so on may also be gelled with silica in these proportions and used in the candy making process. These gels hold their gel structure at temperatures up to 100° F.

Granulations, which have particular value in practicing the present invention, are made by melting a polyethylene glycol having a molecular weight between 3,000 and 10,000, preferably having an average molecular weight of between 4,000 and 6,000, and mixing the molten polyethylene glycol and gelled aromatic as described above until they are thoroughly blended. The homogeneous mass is then cooled to 0° C. to 10° C. to solidify it to the extent that it can be forced through a coarse sieve of about 4 to 10 mesh to obtain a granular product which remains granular at room temperatures and up to about 120° F. The granulation can be weighed out and sprinkled by hand, or with a scoop, over a mass of hot plastic candy. The proportions of silica to aromatic oil to polyethylene glycol may vary considerably depending upon the viscosity of the aromatic oil and the molecular weight of the polyethylene glycol present. In general, they will be in parts by weight, silica one part: volatile aromatics six to fourteen parts: polyethylene glycols (of 4,000 to 10,000 molecular weight) from four to ten parts.

What is claimed is:

1. A method of incorporating volatile aromatic oils in hard candy which comprises granulating a gel composed of one part by weight of microfine silica and six to fourteen parts by weight of aromatic oil with four to ten parts by weight of polyethylene glycol having a molecular weight in the range of 4,000 to 10,000 and mixing the granulation into a plastic mass of hard candy at 220° F. to 260° F.

2. A method in accordance with claim 1 in which the volatile aromatic oils include at least one member of the group consisting of eucalyptol, menthol and lemon oil.

3. A method in accordance with claim 1 in which the candy containing the volatile aromatic oils is subsequently pulled on a candy pulling machine.

References Cited

UNITED STATES PATENTS

| | | | |
|---|---|---|---|
| 2,925,344 | 2/1960 | Peat | 99—140 |
| 3,404,011 | 10/1968 | Eolkin | 99—140 |
| 3,271,256 | 9/1966 | Frey | 99—134 |

OTHER REFERENCES

Bush, W. J.: Skuse's Complete Confectioner, W. J. Bush & Co. Ltd., London, England, 1957, pp. 44–45 and 86–87.

RAYMOND N. JONES, Primary Examiner

J. M. HUNTER, Assistant Examiner